ized Dec. 3, 1968

3,414,555
NOVEL NICKEL CONTAINING SUBSTANCES AND THEIR USE AS POLMERISATION CATALYSTS IN PREPARATION OF POLYOLEFINS
Derek Keith Jenkins, Southampton, and Donald George Timms, East Boldre, England, assignors to The International Synthetic Rubber Company Limited, Southampton, England, a corporation of the United Kingdom
No Drawing. Filed Nov. 23, 1965, Ser. No. 509,423
Claims priority, application Great Britain, Nov. 24, 1964, 48,304/64
9 Claims. (Cl. 260—94.3)

ABSTRACT OF THE DISCLOSURE

An olefin polymerization catalyst comprising the reaction product of a zerovalent nickel-phosphorus compound of the formula $Ni(PA_xB_{3-x})_4$ wherein A is alkyl, cycloalkyl, aryl, substituted aryl, substituted alkyl, alkoxy, aryloxy or hydrogen; B is halogen or psuedo halogen; and $x$ is a whole number in the range 0–3, and, a transition metal compound containing at least one halogen-to-metal bond, and optionally, a transition-metal-free Lewis acid.

---

The present invention relates to new substances having catalytic properties in the polymerisations of olefins, including mono-olefins, especially those containing polar groups, e.g. butyl vinyl ether, and conjugated diolefins, particularly butadiene and isoprene.

It is known that catalysts for the polymerisation of conjugated diolefins may be made by reacting a transition-metal compound with a compound containing metal-carbon and/or metal-hydrogen bonds. This method forms the basis of the Ziegler catalyst systems. Such catalyst systems may be used to obtain polymers having a high cis-1,4 content. It has also been shown that similar catalysts may be made by reacting metal carbonyls with organo-metallic compounds or Lewis acids.

In this specification a polymer having a high cis-1,4 content is taken to mean a polymer having a content of at least 80% of cis-1,4 units.

It has now been discovered that certain nickel-phosphorus compounds may be combined with a compound of a transition metal, which may be a Lewis acid, and optionally with a transition-metal-free Lewis acid, to provide new catalyst systems.

In this specification the term "transition metal" is intended to mean those metals which are regarded as having partly-filled "d" or "f" shells of extra-nuclear electrons.

The new substances may be prepared by combining a nickel-phosphorus compound having the general formula $Ni(P.A_xB_{3-x})_4$ where A is an alkyl, cycloalkyl, aryl, substituted alkyl or aryl, alkoxy or aryloxy radical or a hydrogen atom, B is a halogen atom or a pseudo-halogen radical, such as a cyano radical, and $x$ is 0, 1, 2 or 3, with a compound of a transition metal which is preferably hydrocarbon-soluble and which contains at least one halogen-to-metal bond and optionally a transition-metal-free Lewis acid.

The composition formed by mixing the nickel-phosphorus compound with transition-metal compound and optionally Lewis acid is new and has valuable catalytic properties. The indications that a novel compound is formed on mixing are a colour change, some precipitation, and other changes in physical characteristics. Such a novel compound is included within the scope of the word "substance" used to define the catalyst system.

Specific examples of useful nickel-phophorus compounds are $Ni(PCl_3)_4$, $Ni(PF_3)_4$, $Ni(PBr_3)_4$ and $Ni(PhPCl_2)_4$.

The transition-metal compounds which are particularly useful in connection with the present invention are, for example, titanium tetrachloride, vanadium tetrachloride, vanadyl trichloride, and molybdenum pentachloride.

The Lewis acids which are not transition-metal compounds include $AlCl_3$, $AlBr_3$, $BF_3$, $BF_3.Et_2O$.

The invention includes within its scope a method of polymerisation of olefins, particularly conjugated diolefins, and especially butadiene or isoprene. The polymerisation can be carried out at a temperature between −30° C. and 150° C., in the presence or absence of a solvent for the reactants, and in the presence of a catalyst system as hereinbefore defined. Various solvents may be used; thus pentane, hexane, heptane, iso-octane, petroleum ether, alkylates, cyclohexane, methylcyclohexane, benzene, toluene, xylene, decalin, tetralin, butenes, pentenes and chlorinated hydrocarbons are all satisfactory polymerisation media. The catalyst system may be prepared separately, or formed in situ, either from the nickel-phosphorus compound and the transition-metal compound and optionally Lewis acid, or from simpler compounds. A nickel-phosphorus compound $Ni(PCl_3)_4$ may be formed by reacting nickel carbonyl and phosphorus trichloride, and may then (e.g.) be reacted with $AlCl_3$ and $TiCl_4$. It is preferred to add the transition-metal compound and optionally Lewis acid to the polymerisation medium containing the nickel-phosphorus compound, rather than to add monomer to the fully-formed catalyst system, since in this way the yield of polymer can be increased.

In the polymerisation reaction, catalyst systems formed from the nickel-phosphorus compound and mixtures of Lewis acids are of particular value, since when such mixtures are used the formation of cross-linked gelled polymer can be eliminated, hindered or promoted at will. One suitable mixture of Lewis acids which may be mentioned is aluminum trichloride and titanium tetrachloride.

The Examples Nos. 1–20 given in the following table illustrate the present invention. The catalyst ingredients are shown in millimoles in the 2nd, 3rd and 4th columns of the table.

| No. | Catalyst ingredients | | | Solvent, ml. | Monomer, grams | Time, hours | Temperature, °C | Yield, grams | Structure | Comments |
|---|---|---|---|---|---|---|---|---|---|---|
| | Ni(PCl₃)₄ | TiCl₄ | AlCl₃ | | | | | | | |
| 1 | 0.5 | 0.5 | 0.5 | Toluene 50 | 17 butadiene | 17 | 20 | 17 no gel, soluble. | 92% cis IV 0.65. | TiCl₄ added after monomer, Ni(PCl₃)₄, AlCl₃ mixed in toluene (Solvent) before monomer added. |
| 22 | 0.5 | 0.5 | 0.25 | do | 16 butadiene | 17 | 20 | 16 no gel, soluble. | 94.5% cis IV 0.77. | As (1). |
| 3 | 0.5 | 0.5 | | do | 14 butadiene | ½ | 25 | 14 gelled | | As (1) Some soluble polymer with gel. |
| 4 | 0.5 | 1.0 | | do | 16 butadiene | ½ | 20 | 16 gelled | | As (3). |
| 5 | 0.5 | 0.5 | | do | 8 isoprene | 3 | 20 | 8 insoluble, not gel. | | Insoluble polymer. As (1). |
| 6 | 0.5 | 1.0 | 0.5 | do | do | 17 | 20 | 8.5 soluble | 88% cis | As (1) Structure determined on soluble portion, which was rubbery. |
| 7 | 0.5 | 0.5 | 0.5 | do | 15 butadiene | 17 | 55 | 3 no gel, soluble. | 91.5% cis IV 0.71. | As (1) Only partial conversion. |
| 8 | 0.5 | 0.5 | 0.5 | do | 17 butadiene | 17 | 0 | 15 no gel, soluble. | 94% cis IV 0.73. | As (1). |
| 9 | 0.5 | 0.5 | 0.25 | do | do | 19 | 20 | 12 no gel, soluble. | | Catalyst components mixed before monomer addition. |
| 10 | 0.5 | | 0.5 | do | 16 butadiene | 17 | 20 | 0.7 no gel, soluble. | 89% cis | Catalyst components mixed then monomer added. |
| 11 | 0.5 | | 0.5 | do | do | 17 | 55 | 0.5 no gel, soluble. | | As (10). |
| 12 | 0.025 | 0.1 | | Hexane 100 | 25 butadiene | 17 | 20 | 14 | 94.2% cis IV 3.1. | |
| 13 | 1.0 | 2.0 | 2.5 | Benzene 100 | 25 butyl vinyl ether. | 17 | 20 | 6 | Elastic polymer. | |
| | Ni(PCl₃)₄ | VOCl₃ | AlCl₃ | | | | | | | |
| 14 | 1.0 | 0.5 | | Toulene 50 | 8 isoprene | 3 | 20 | 8 insoluble | | Catalyst components mixed before monomer addition. |
| 15 | 1.0 | 0.5 | | do | do | 3 | 20 | do | | VOCl₃ added after monomer. |
| 16 | 1.0 | 0.5 | 0.5 | do | 16 butadiene | 17 | 20 | 50 (0.7 g. gel) | | As (14). |
| | Ni(PCl₃)₄ | TiCl₄ | BF₃Et₂O | | | | | | | |
| 17 | 0.5 | 0.5 | 0.5 | Hexane 50 | 13 butadiene | 0.5 | 25 | 13 micro gel | 80% cis | |
| 18 | 0.5 | 0.5 | 0.1 | do | do | 0.5 | 25 | do | 80% cis | |
| | Ni(PhPCl₂)₄ | TiCl₄ | AlCl₃ | | | | | | | |
| 19 | 0.5 | 0.5 | 0.25 | do | 17 butadiene | 17 | 20 | 7 no gel, soluble. | | As (1). |
| | Ni(PBr₃)₄ | TiCl₄ | AlCl₃ | | | | | | | |
| 20 | 0.5 | 0.5 | 0.25 | Toluene 50 | do | 17 | 20 | 14 no gel, soluble. | 87% cis | As (1). |

We claim:

1. An olefin polymerization catalyst comprising the reaction product of:
   (a) A zerovalent nickel-phosphorus compound of the formula Ni(PA$_x$B$_{3-x}$)$_4$ where in A is alkyl, cycloalkyl, aryl, substituted aryl, substituted alkyl, alkoxy, aryloxy, or hydrogen; B is halogen or psuedo halogen; and, $x$ is a whole number in the range 0-3; and,
   (b) A transition metal compound containing at least one halogen-to-metal bond.

2. The catalyst of claim 9 wherein a transition-metal-free Lewis acid is included as a reactant for said reaction product.

3. A catalyst as claimed in claim 1 derived from the nickel-phosphorus compound Ni(PhPCl₂)₄.

4. A catalyst as claimed in claim 1 derived from a nickel-phosphorus compound of the formula Ni(PX₃)₄ where X is a halogen atom of atomic number lower than 50.

5. A catalyst as claimed in claim 1 derived from titanium tetrachloride.

6. A catalyst as claimed in claim 1 derived from vanadium oxytrichloride.

7. A catalyst as claimed in claim 2 derived from aluminium trichloride.

8. An olefin polymerisation process using a catalyst constituted by a reaction product as claimed in claim 1.

9. A process as claimed in claim 7 in which the polymerisation is carried out in a medium selected from the group consisting essentially of pentane, hexane, heptane, iso-octane, petroleum ether, alkylates, cyclohexane, methylcyclohexane, benzene, toluene, xylene, decalin, tetralin, butenes, pentenes and chlorinated hydrocarbons.

References Cited

UNITED STATES PATENTS 3,066,125  11/1962  Porter, et al.  260—94.3
3,228,917  1/1966  Childers  260—84.1
3,328,443  6/1967  Clark, et al.  260—439

JOSEPH L. SCHOFER, *Primary Examiner.*

R. A. GAITHER, *Assistant Examiner.*